(12) United States Patent
Feng

(10) Patent No.: US 9,255,201 B2
(45) Date of Patent: Feb. 9, 2016

(54) KENAF REINFORCED RUBBER FOR POWER TRANSMISSION BELTS

(71) Applicant: The Gates Corporation, Denver, CO (US)

(72) Inventor: Yuding Feng, Rochester Hills, MI (US)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 13/692,585

(22) Filed: Dec. 3, 2012

(65) Prior Publication Data

US 2013/0150488 A1   Jun. 13, 2013

Related U.S. Application Data

(60) Provisional application No. 61/569,744, filed on Dec. 12, 2011.

(51) Int. Cl.

| | |
|---|---|
| *C08L 97/02* | (2006.01) |
| *C08L 21/00* | (2006.01) |
| *F16G 1/08* | (2006.01) |
| *F16G 5/06* | (2006.01) |

(52) U.S. Cl.
CPC ............... *C08L 97/02* (2013.01); *C08L 21/00* (2013.01); *F16G 1/08* (2013.01); *F16G 5/06* (2013.01)

(58) Field of Classification Search
CPC ............... F16G 1/08; F16G 1/10; F16G 5/06; F16G 5/08; C08L 97/02
USPC ........................................ 524/9; 474/260, 263
See application file for complete search history.

(56) References Cited

U.S. PATENT DOCUMENTS

| | | | |
|---|---|---|---|
| 3,580,767 A | 5/1971 | Barnes et al. | |
| 6,616,558 B2 * | 9/2003 | South | ........................... 474/260 |
| 6,663,733 B2 | 12/2003 | Nagaya et al. | |
| 7,445,835 B2 * | 11/2008 | Serizawa et al. | ........... 428/297.4 |
| 2005/0250931 A1 | 11/2005 | Takagi | |
| 2006/0147695 A1 | 7/2006 | Serizawa et al. | |
| 2006/0148603 A1 | 7/2006 | Burrowes et al. | |
| 2010/0076118 A1 | 3/2010 | Yano et al. | |

OTHER PUBLICATIONS

Kashani, M. R., "Aramid-short-fiber reinforced rubber as a tire tread composite," J. App. Polym. Sci, 2009, 113, 1355-1363.*
Ehrenstein, G. W., "Reinforced Plastics," Ullmann's Encyclopedia of Industrial Chemistry, vol. 31, pp. 453-469. Published online 2000.*
Lloyd, E. H., et al., "Bast fiber applications for composites," article downloaded from www.fibrealternatives.com, available online on Apr. 3, 2009.*
Daan Feng et al., "Effect of Compatibilizer on the Structure-Property Relationships of Kenaf-Fiber/Polypropylene Composites," Polymer Composites, Aug. 2001, vol. 22, No. 4, pp. 506-517.
Kugler, D.E., "Kenaf commercialization: 1986-1995," 1996, pp. 129-132, In: J. Janick (ed.), Progress in new crops. ASHS Press, Alexandria, VA.

(Continued)

*Primary Examiner* — Mark Eashoo
*Assistant Examiner* — Nicholas Hill
(74) *Attorney, Agent, or Firm* — Paul N. Dunlap, Esq.; Jeffrey A. Thurnau, Esq.

(57) ABSTRACT

An elastomeric composition and a power transmission belt based on the elastomeric composition, wherein the composition includes kenaf fiber.

11 Claims, 3 Drawing Sheets

(56) References Cited

OTHER PUBLICATIONS

Daniel F. Caulfield, et al., "Dynamic and Mechanical Properties of Agro-fiber Based Composites," presented Jun. 1, 1998, In: Progress in Woodfibre-Plastic Composites: Emergence of a New Industry, eds. John J. Balatinecz et al.

Roger M. Rowell, et al., "Characterization and Factors Effecting Fiber Properties," 2000, pp. 115-134, In: Frollini, E. et al., eds., "Natural polymers and agrofibers based composites: preparation, properties and applications," São Carlos, Brazil: USP-IQSC / Embrapa Instrumentação Agropecuária / Botucatu: UNESP, 2000, ISBN: 85-86463-06-X.

Mehdi Tajvidi et al., "Time-Temperature Superposition Principle Applied to a Kenaf-Fiber/High-Density Polyethylene Composite," Journal of Applied Polymer Science, vol. 97, pp. 1995-2004 (2005).

Hazleen Anuar et al., "Impact and Tensile Properties of Kenaf Fiber Reinforced Thermoplastic Natural Rubber Composites," J. Solid St. Sci. and Technol. Letters, vol. 12, No. 1 & 2 (2005) pp. 1-5, ISSN 0128-8393.

Aimin Liu, "World Production and Potential Utilization of Jute, Kenaf, and Allied Fibers," In: Proceedings of the 2000 International Kenaf Symposium, Hiroshima, Japan.

Thomas A. Rymsza, "Kenaf and the 21st Century Current Developments and Trends," [source unknown].

I.S. Aji et al., "Kenaf Fibres as Reinforcement for Polymeric Composites: A Review," International Journal of Mechanical and Materials Engineering (IJMME), vol. 4 (2009), No. 3, pp. 239-248.

Sangyeob Lee et al., "Properties of Unidirectional Kenaf Fiber-Polyolefin Laminates," 2009, pp. 1-8, Polymer Composites, DOI 10.1002/pc, Published online in Wiley InterScience (www.interscience.wiley.com).

Yajuan Tian et al., "Polyethylene Composites Reinforced by Kenaf Fiber Modified by Silane Grafted Low Density Polyethylene," [unknown source].

M. P. Westman et al., "Natural Fiber Composites: A Review," Mar. 2010, PNNL-19220, Prepared for the U.S. Department of Energy under Contract DE-AC05-76RL01830.

D. Dimeski et al., "Kenaf fiber/Polypropylene composites as potentional material for partitioning panels in buildings," [unknown source].

Y. Xu et al., "Thermomechanical properties of the silanized-kenaf/polystyrene composites," eXPRESS Polymer Letters vol. 3, No. 10 (2009) pp. 657-664, Available online at www.expresspolymlett.com DOI: 10.3144/expresspolymlett.2009.82.

Anuar H et al., "Improvement in Mechanical Properties of Reinforced Thermoplastic Elastomer Composite with Kenaf Bast Fibre," Composites Part B: Engineering, Elsevier, UK, Dec. 8, 2010, vol. 42, No. 3, pp. 462-465.

R Rowell & H Stout, "Jute and Kenaf," in M Lewin & E Pearce ed's, "Handbook of fiber chemistry," CRC Press, vol. 2, Feb. 26, 1998, pp. 465-502, ISBN: 0824794710.

* cited by examiner

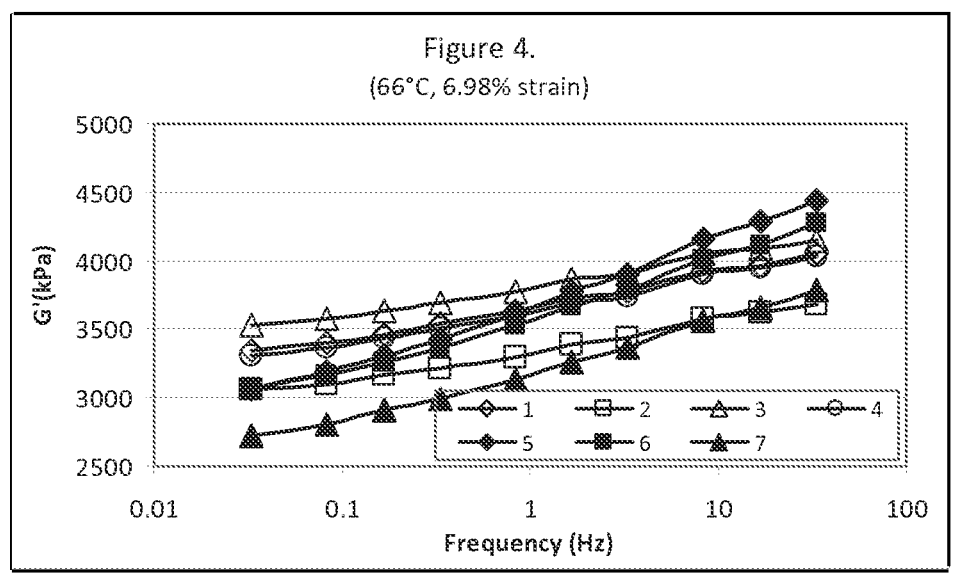
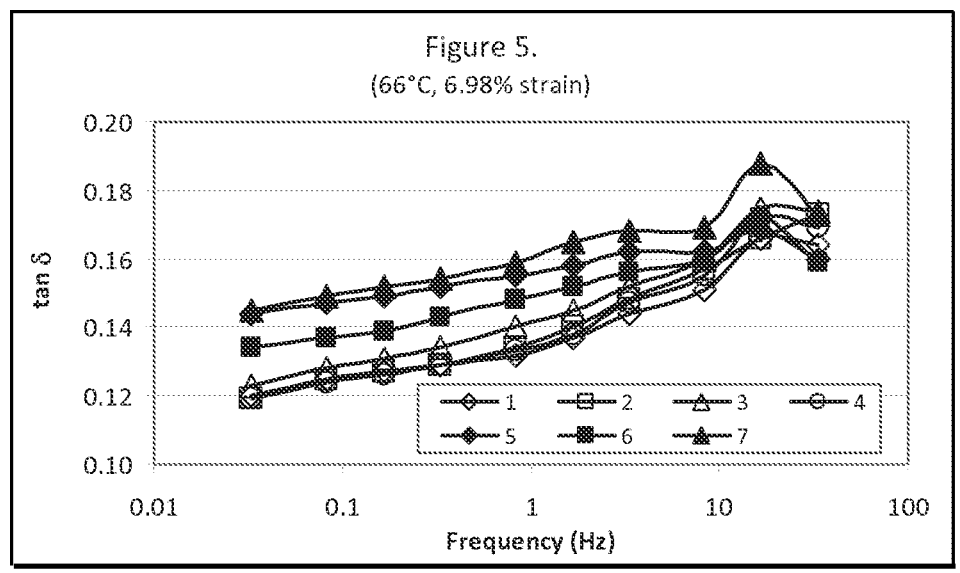

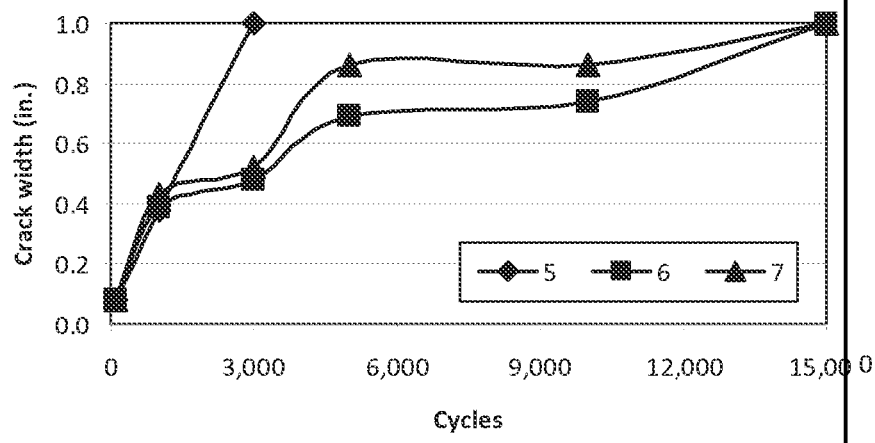
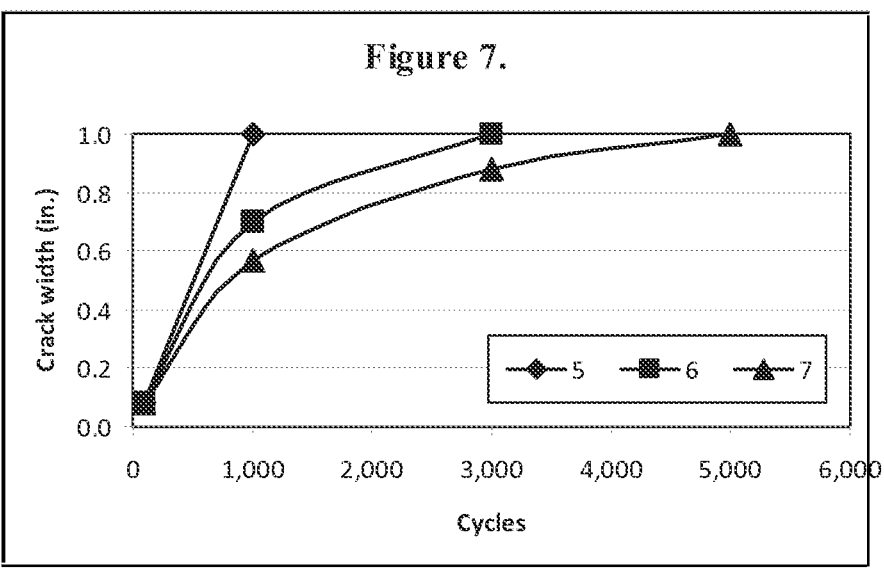

KENAF REINFORCED RUBBER FOR POWER TRANSMISSION BELTS

BACKGROUND OF THE INVENTION

1. Field of the Invention

This invention relates generally to the field of power transmission belts, more particularly to rubber compositions suitable for belts, and specifically to a rubber composition reinforced with native kenaf fiber for use in belts.

2. Description of the Prior Art

Common power transmission belts include V-belts, flat belts, toothed or synchronous belts and multi-ribbed belts. Common belt construction includes an elastomeric belt body, spiraled or helically wound tension cord or other textile tensile member embedded in the belt body, and often other textile reinforcements embedded in the belt body or covering one or more of the belt surfaces.

The elastomeric belt body may include one or more vulcanized rubber composition, or a thermoplastic elastomer, or other elastomeric composition. Elastomer compositions used have included various fibrous reinforcements dispersed therein. Of the many fibers available, relatively few have found commercial success because of various processing and performance needs including excellent adhesion between fiber and elastomer, dispersibility, for wear and abrasion resistance, thermal resistance, environmental resistance, cost, reinforcement effect, and the like.

US 2010/0076118A1 discloses chemically modified microfibril cellulose for use in tire rubber, e.g., in natural rubber (NR), butadiene rubber (BR), styrene-butadiene rubber (SBR), and acrylonitrile butadiene rubber (NBR). Chemical modification of the microfibril cellulose is taught for improving dispersibility in the rubber and adhesion to the rubber in order to render it is useful. A method using the chemically modified microfibril cellulose in the form of a masterbatch prepared by complexing a rubber latex with the chemically modified microfibril cellulose in a water medium in advance is necessary in order to achieve good tensile characteristics and tire performance characteristics.

Kenaf has been suggested for biodegradable thermoplastic compositions. US 2006/0147695A1 discloses the use of kenaf bast fiber in crystalline thermoplastic resins such as polylactic acid resin for products such as electrical and electronic equipment. To improve the impact strength of the composition, it is taught to remove kenaf fragments before use or use a softening component or add a high strength impact resistant fiber. It is also taught that surface treatment of the kenaf fiber may be necessary to improve compatibility with the resin, impact resistance, and/or flame retardancy.

US 2005/0250931A1 discloses use of a long list of natural fibers including kenaf for increasing rigidity and impact strength of molded parts made from polylactic acid resin or parts based on recycled shredder dust thereof.

U.S. Pat. No. 6,663,733 discloses techniques for manufacturing synthetic resin-based products useful to form plate- or sheet-like products for use in vehicles. A ground plant product such as ground kenaf core product is taught in order to reduce specific gravity of the products.

Thus, the prior art fails to disclose or suggest a practical rubber composition for use in belts based on synthetic rubber reinforced with kenaf fiber.

SUMMARY

The present invention is directed to systems and methods which provide elastomeric compositions for power transmission belts. The advantages of this invention include the benefits of using an environmentally friendly reinforcing filler, and providing a high value rubber compound achieving a relatively high compound modulus with a low cost fiber.

The invention is directed to a power transmission belt having an elastomeric belt body, having an elastomeric composition that includes kenaf fiber. Preferably the kenaf fiber is bast fiber. The kenaf fiber may be present in the elastomeric composition at a level of 1 to 50 parts per hundred parts of base elastomer. The kenaf fiber may be chopped bast fiber with average fiber length of 1 to 3 mm. The composition may also include a compatibilizer or coupling agent to improve the compatibility between rubber elastomer and these natural fibers. The kenaf fibers may be treated with an adhesive or provided in a masterbatch formulation.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings:

FIG. 4 is a graph of dynamic modulus versus frequency for some example and comparative compounds;

FIG. 5 is a graph of tan δ versus frequency for some example and comparative compounds;

FIG. 6 is a graph of with grain-crack growth versus cycles for some examples and a comparative compound; and FIG. 7 is a graph of with cross-crack growth versus cycles for some examples and a comparative compound.

DETAILED DESCRIPTION

Figure 1:
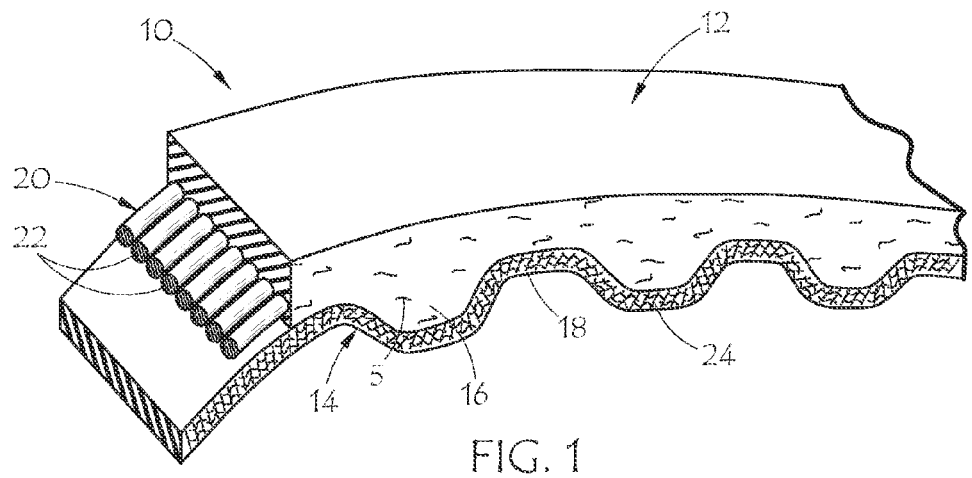
FIG. 1 is a fragmented perspective view, with parts in section, of a synchronous belt constructed in accordance with an embodiment of the present invention.

The present invention is directed to use of kenaf fibers in elastomeric compositions useful for flexible power transmission belts. Kenaf (*Hibiscus cannabinus* L.) is an annual herbaceous plant originally from Africa. It is a newer crop to the United State. Kenaf is mainly cultivated in following southern temperate regions: Mississippi, Texas, California, Louisiana, New Mexico, and Georgia. It has a growing period of 90-150 days and may grow to 2.4-6 m in height. Its single, straight stem consists of an outer fibrous bark and an inner woody core which yields two distinct types of fibers: bast and core fibers respectively. The bast fiber constitutes about 26-35 wt % (weight percentage) of its stem, and genetic strains have been developed which yield 35 wt % or greater bast portions. The harvested kenaf stems are usually first decorticated to separate the bark from the core producing ribbons of kenaf bast fibers. These ribbons can be retted into fiber bundles or single fibers. It is preferable to harvest the kenaf crop once the fiber has been air-dried (approximately 10% moisture content). Drying is achieved by leaving the crop standing in the field.

In general, the kenaf bast fibers are hollow tubes averaging 2.6 mm in length, 21 µm in diameter with an average length/diameter aspect ratio of 124, very similar to softwood species. The core fibers, with an average length of 0.5 mm, closely match those of hardwoods.

The major constituents of kenaf bast fiber bundles (KBFB) are cellulose, hemicellulose and lignin. The amount of each constituent can vary significantly due to cultivation environments, geographic origins, age, locations in the plant (from root to tip), and retting and separating techniques. Erwin H. Lloyd and David Seber, "Bast fiber applications for composites," (April 1996) in proceeding of: 30th Annual International Composites Symposium, at Washington State University, Pullman, Wash., Volume: 1996, reported weight percentages of 60.8 for cellulose, 20.3 for hemicellulose, 11.0 for lignin, 3.2 for extractives, and 4.7 for ash. Mohanty et al, "Biofibres, biodegradable polymers and biocomposites: an overview," *Macromolecular materials and engineering*, 276-277(1):1-24 (2000) reported lower cellulose (31-39 wt %) and higher lignin (15-19 wt %) amounts. Rowell et al., "Characterization and factors effecting fiber properties," In: Frollini E, Leão A L, Mattoso L H C, editors. "Natural polymers and agrofibers based composites: preparation, properties and applications," San Carlos, Brazil: L. H. C., Embrapa. pp. 115-134 (2000) reported 44-57 wt % cellulose, and 15-19 wt % lignin.

Kenaf is a cellulosic source with ecological and economical advantages, abundant, exhibiting low density, nonabrasive during processing, high specific mechanical properties, biodegradable and cheap pricing. Historically, kenaf fiber was first used as cordage. Industry is now exploring the use of kenaf in papermaking and nonwoven textiles. Potential applications of kenaf products include paper pulp, cordage, grass erosion mats, animal bedding, oil sorbents, potting media, animal litter, insulation boards, fillers for plastics, and textiles.

Table 1 compares mechanical properties of kenaf fiber and other fibers from the literature. The outstanding feature of kenaf fiber is its Young's modulus, which is close to E-glass fiber and aramid fiber. Its tensile strength is not high enough for belt tensile cord applications, but according to an embodiment of the invention, it is suitable for using as a filler to reinforce rubber belt compounds to provide belt shape stabilization or stiffening and/or cord support.

TABLE 1

| Fiber | Density (g/cc) | Diameter (µm) | Tensile strength (MPa) | Young's Modulus (GPa) | Elongation at break (%) |
|---|---|---|---|---|---|
| Kenaf | 1.45 | 21 | 930 | 53 | 1.6 |
| Flax | 1.5 | 40-600 | 345-1500 | 27.6 | 2.7-3.2 |
| Sisal | 1.5 | | 511-635 | 9.4-22 | |
| Cotton | 1.5-1.6 | 12-38 | 287-800 | 5.5-12.6 | 7-8 |
| Nylon | 1.0-1.2 | | 40-90 | 3-5 | 20-60 |
| Polyester | 1.2-1.5 | | 40-90 | 2-4.5 | 12-47 |
| E-glass | 2.55 | <17 | 3400 | 73 | 2.5 |
| Kevlar | 1.44 | | 3000 | 60 | 2.5-3.7 |
| Carbon | 1.78 | 5-7 | 3400-4800 | 240-425 | 1.4-1.8 |

Preferred kenaf fibers for practicing the present invention are the longer bast fibers from bark, separated form the shorter core fibers, and chopped to a useful length for use in belt compositions. Suitable fiber lengths may be in the range from 0.5 to 5 mm, or from 1 to 4 mm, or 1 to 3 mm or 2 to 3 mm. Preferred loadings will depend on the amount of reinforcement desired, but may advantageously be in the range of 0.5 to 50 parts weight per hundred parts of the base elastomer (PHR), or from 1 to 30 PHR. Suitable fibers may be obtained from BioTech Mills, Inc.

It is advantageous to treat the fibers with and/or include in the elastomer composition a compatibilizer to improve adhesion to the elastomer matrix and/or to improve dispersion in the base elastomer or elastomer matrix. Useful treatment options include adhesives, dips, latexes, or formulation into a masterbatch.

The compatibilizer may be a maleated polymer such as maleated ethylene alpha olefin polymers such as maleated ethylene propylene copolymers (EPM) or maleated ethylene propylene diene terpolymers (EPDM) or the like. The compatibilizer may be a maleated diene polymer such as maleated polybutadiene or the like. The compatibilizer may be a silane-grafted polymer. The compatibilizer could be a coupling agent, such as a silane coupling agent, titanate coupling agent, zirconate coupling agent or the like. The compatibilizer could be a carboxyl- or acrylate-functional material, including carboxylated polymers or oligomers or monomers, or metal salts of acrylic or carboxylic acids, and the like.

The treatment for the kenaf fiber could be a resorcinol-formaldehyde-latex (RFL) type adhesive treatment, or a latex treatment, or a rubber cement treatment, or the like. The kenaf fiber could be blended into an elastomer or rubber composition at high loading as a masterbatch, for subsequent mixing into the elastomer compound for the belt body. Preferably the elastomer for blending or the latex for the latex treatment or RFL is chosen to be compatible with the elastomer compound for the belt body.

Figure 2:
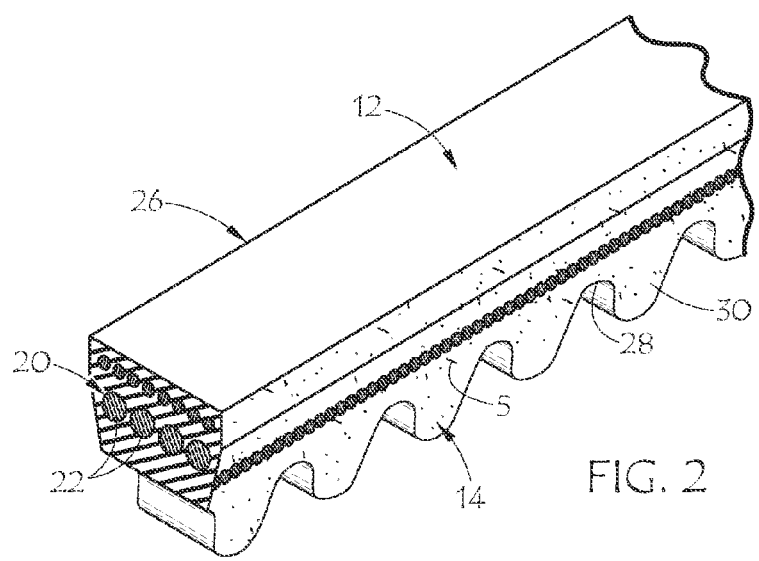
FIG. 2 is a fragmented perspective view, with parts in section, of a V-belt constructed in accordance with an embodiment of the present invention.
Figure 3:
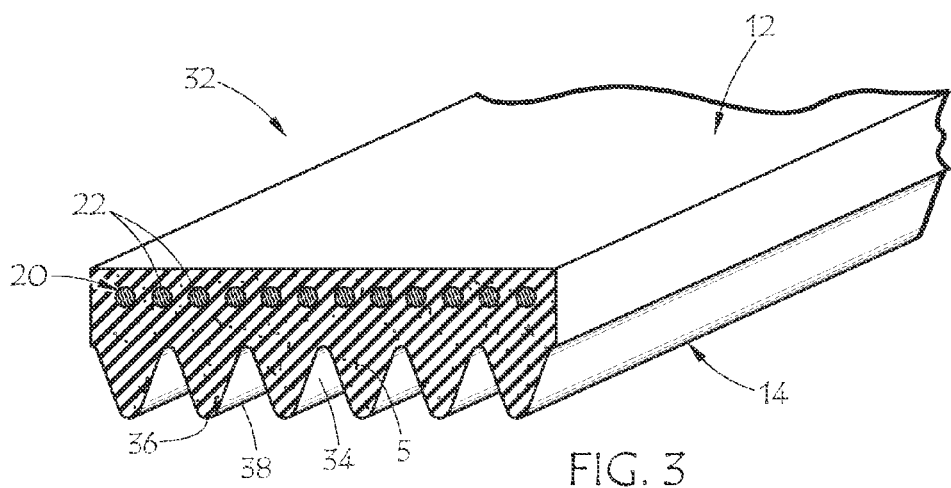
FIG. 3 is a fragmented perspective view, with parts in section, of a multi-V-ribbed belt constructed in accordance with an embodiment of the present invention

In each of the three exemplary belt embodiments shown in FIGS. 1-3, the main belt body portion 12 and or any elastomer layers therein may be formed of any conventional and/or suitable cured elastomer composition, one or more of which includes kenaf fibers 5 and preferably a suitable compatibilizer. The fibers illustrated in the figures are not to scale. Suitable elastomers that may be utilized for this purpose include for example polyurethane elastomers (including as well polyurethane/urea elastomers and so-called millable gums) (PU), polychloroprene rubber (CR), acrylonitrile butadiene rubber (NBR), hydrogenated NBR (HNBR), styrene-butadiene rubber (SBR), alkylated chlorosulfonated polyethylene (ACSM), polyepichlorohydrin, polybutadiene rubber (BR), natural rubber (NR), and ethylene alpha olefin elastomers such as ethylene propylene copolymers (EPM), ethylene propylene diene terpolymers (EPDM), ethylene octene copolymers (EOM), ethylene butene copolymers (EBM), ethylene octene terpolymers (EODM); and ethylene butene terpolymers (EBDM); ethylene vinylacetate elastomers (EVM); ethylene methylacrylate (EAM); and silicone rubber, or a combination of any two or more of the foregoing.

To form the elastomeric belt (or other article's) body portion 12 in accordance with an embodiment of the present invention, the elastomer(s) may be blended according to known mixing methods with kenaf fibers and with conventional rubber compounding ingredients including but not limited to fillers, plasticizers, stabilizers, vulcanization agents/curatives, coagents, and accelerators, in amounts conventionally employed. For example, for use with ethylene-alpha-olefin elastomer and diene elastomers such as HNBR, one or more metal salts of alpha-beta organic acids may be employed in amounts now conventionally utilized to improve dynamic performance of the resultant article. Thus zinc dimethacrylate and/or zinc diacrylate may be utilized in such compositions in amounts of from about 1 to about 50 phr; or alternatively of from about 5 to about 30 phr; or of from about 10 to about 25 phr.

One skilled in the relevant art would readily appreciate any number of suitable starting compositions for utilization in or as the elastomeric portions of the rubber articles useful herein. A number of suitable elastomer starting compositions are described for example in The R. T. Vanderbilt Rubber Handbook (13$^{th}$ ed., 1996), and with respect to EPM or EPDM compositions and such compositions having particular high tensile modulus properties, are furthermore set forth in U.S. Pat. Nos. 5,610,217, and 6,616,558 respectively, the contents of which, with respect to various elastomer compositions that may be suitable for use in the formation of power transmission belt body portions, are specifically incorporated herein by reference. In an embodiment of the present invention associated with automotive accessory drive applications, the elastomeric belt body portions 12 may be formed of a suitable ethylene alpha olefin composition, such as an EPM, EPDM, EBM or EOM composition. In each composition, kenaf fibers and an associated compatibilizer may advantageously be added to the composition or substituted for part or all of the other fibers present in the composition, according to an embodiment of the invention.

The elastomeric main belt body portion 12 may moreover be further loaded with other types of discontinuous fibers besides kenaf, such as including but not limited to cotton, polyester, fiberglass, aramid, acrylic, and nylon, in such forms as staple or chopped fibers, flock or pulp, in amounts generally employed. In a preferred embodiment relating to profiled (e.g., as by cutting or grinding) multi-v-ribbed belts, such fiber loading is preferably formed and arranged such that a substantial portion of the fibers are formed and arranged to lay in a direction generally transverse the direction of travel of the belt. In molded multi-v-ribbed belts and/or synchronous belts made according to flow-through methods however, the fiber loading would generally lack the same degree of orientation.

Three belt embodiments are now illustrated. Referring to FIG. 1, a synchronous belt 10 is illustrated. Belt 10 includes elastomeric main body portion 12 with kenaf fibers 5 according to an embodiment of the invention, and sheave contact portion 14 positioned along the inner periphery of main body portion 12. This particular sheave contact portion 14 is in the form of alternating transverse teeth 16 and land portions 18 which are designed to mesh with a transverse-grooved pulley or sprocket. Tensile layer 20 is positioned within main body portion 12 for providing support and strength to belt 10. In the illustrated form, tensile layer 20 is in the form of a plurality of tensile cords 22 aligned longitudinally along the length of main body portion 12. It should be understood that, in general, any type of tensile layer 20 known to the art may be utilized. Moreover, any desired material may be used as the tensile member, such as cotton, rayon, polyamide, polyester, aramid, steel, glass, carbon, PBO, polyketone, basalt, boron, and even discontinuous fibers oriented for low load carrying capability. Reinforcing fabric 24 may be utilized and intimately fits along the alternating teeth 16 and alternating land portions 18 of belt 10 to form a face cover or tooth cover for the sheave contact portion. This fabric may be of any desired configuration such as a conventional weave consisting of warp and weft threads at any desired angle or may consist of warp threads held together by space pick cords, or of a knitted or braided configuration, or a nonwoven fabric, and the like. Conventional fabrics may be employed using such materials as cotton, polyester, polyamide, acrylic, aramid, polyketone, hemp, jute, fiberglass, and various other natural and synthetic fibers including blends or combinations thereof.

Referring to FIG. 2, standard notched V-belt 26 is illustrated therein. V-belt 26 includes an elastomeric body portion 12 with kenaf fibers 5 according to an embodiment of the invention and similar to that of FIG. 1, and tensile reinforcement layer 20 in the form of cords 22, also similar to that as illustrated in FIG. 1. The elastomeric body 12, tensile layer 20, and cords 22 of V-belt 26 may be constructed from the same materials as described above for FIG. 1. It should be noted that the tensile layer 20 may optionally include an elastomeric composition or rubber material that is different than the rest of the main body portion in order to provide a transitional layer in terms of modulus or other property and/or to function as an adhesive layer between cord and main body. An embodiment of the elastomeric composition containing kenaf fibers may be utilized in any one or more of the elastomer layers used within a given belt construction. V-belt 26 also includes sheave contact portion 14 as in the power transmission belt of FIG. 1. In this embodiment, however, sheave contact portions 14 are the two juxtaposed sides of the belt, designed to wedge into a V-sheave. The bottom surface of V-belt 26 is in the form of alternating notch depression surfaces or troughs 28 and projections 30, which are optional. Included in the category of V-belts are those V-belts designed for continuously variable transmission ("CVT") applications, which often exhibit a belt body relatively wider than the belt thickness.

Referring to FIG. 3, multi-V-ribbed belt 32 is illustrated. Multi-V-ribbed belt 32 includes main elastomeric body portion 12 with kenaf fibers 5 according to an embodiment of the invention, as in the belts of FIGS. 1 and 2 and also includes tensile reinforcement member 20 preferably in the form of cords 22, also as previously described. Longitudinally grooved sheave contact portion 14 is in the form of a plurality of raised areas or apexes 36 alternating with a plurality of trough areas 38 having oppositely facing sides which define driving surfaces 34 of the belt 32. In each of these instances of FIGS. 1-3, sheave contact portion 14 is integral with main body portion 12 and may be formed from the same elastomeric material or layered of different elastomeric material. While the present invention is illustrated with reference to the embodiments shown in FIGS. 1-3, it should be understood that the present invention is not to be limited to these particular embodiments or forms as illustrated but rather is applicable to any belt construction within the scope of the claims as defined below.

The following examples illustrate the use of kenaf in belt rubber compositions. Two base formulations were used. The first formulation, Comparative Example 1 (hereinafter "Comp. Ex."), is a typical V-belt body formulation that is a sulfur-cured SBR/NR (70:30) blend formulation with about 13.8 PHR of cotton flock and 13.5 PHR of parts of chopped polyester fiber. Examples 2-4 (hereinafter "Ex.") use the same formulation as Comp. Ex. 1 but have 3-mm chopped kenaf bast fiber substituted for the polyester fiber at different levels and with or without a compatibilizer compounded into the formulation as indicated in Table 2.

The second formulation, Comp. Ex. 5, is a typical multi-v-ribbed belt compound that is a peroxide-cured EPM formulation with 20 PHR of chopped nylon fiber. Examples 6 and 7 use the same formulation as Comp. Ex. 5, but have 25 PHR of 3-mm chopped kenaf bast fiber substituted for all the nylon fiber with and without a compatibilizer compounded into the formulation as indicated in Table 3.

Ricobond 1756HS and Royaltuf 498 were used as compatibilizers to increase the adhesion between kenaf fiber and rubber matrix in the SBR and EPM formulations, respectively. Ricobond 1756HS is maleic anhydride grafted polybutadiene, sold under the Ricobond trademark by Cray Valley, and Royaltuf 498 is maleic anhydride grafted EPDM, sold under the trademark Royaltuf by Chemtura.

The prices for polyester and nylon fibers are around $2 to $2.50/lb; while the price for kenaf fiber should be less than $1/lb. A raw material cost comparison shows about a 10% cost advantage for the examples using kenaf over the comparative examples using polyester and nylon. The chopped kenaf fiber (~3 mm in length) was supplied by BioTech Mills, Inc. Two-pass mixing was used in a conventional internal mixer, with the curatives added and in the second pass.

TABLE 2

| Formulations (PHR) | Comp. Ex. 1 | Ex. 2 | Ex. 3 | Ex. 4 |
|---|---|---|---|---|
| SBR | 70 | 70 | 70 | 70 |
| NR | 30 | 30 | 30 | 30 |
| Carbon black and silica | 76 | 76 | 76 | 76 |
| Other fillers | 47.9 | 47.9 | 47.9 | 47.9 |
| Stabilizers and process aids | 7.6 | 7.6 | 7.6 | 7.6 |
| Oils & plasticizers | 14.1 | 14.1 | 14.1 | 14.1 |
| Cure package | 10.8 | 10.8 | 10.8 | 10.8 |
| Cotton Flock | 13.8 | 13.8 | 13.8 | 13.8 |
| Chopped polyester fiber | 13.5 | — | — | — |
| Kenaf fiber (3 mm chopped) | — | 15 | 15 | 20 |
| Ricobond 1756HS | — | — | 3 | 3 |

TABLE 3

| Formulations (PHR) | Comp. Ex. 5 | Ex. 6 | Ex. 7 |
|---|---|---|---|
| EPM | 100 | 100 | 100 |
| Carbon black and silica | 57 | 57 | 57 |
| Other fillers | 3 | 3 | 3 |
| Stabilizers and process aids | 21 | 21 | 21 |
| Oils & plasticizers | 10 | 10 | 10 |
| Cure package | 5.33 | 5.33 | 5.33 |
| Nylon | 20 | — | — |
| Kenaf fiber (3 mm chopped) | — | 25 | 25 |
| Royaltuf 498 | — | — | 3 |

The formulations listed in Tables 2 and 3 were mixed and tested according to conventional rubber industry practice. Compound rheological properties were evaluated according to ASTM D-1646 on a Mooney viscometer with small rotor operated at 121° C. for 30 minutes. The replacement of the polyester fiber in Comp. Ex. 1 and the nylon fiber in Comp. Ex. 5 with kenaf fiber results in comparable compound Mooney viscosity (MV) and scorch time (t5), as shown by the results in Table 4. Cure properties were evaluated according to ASTM D-5289 on a rotorless cure meter at 177° C. for 30 minutes. Again, the results are comparable for torque difference (MH-ML) and compound cure speed. Only Ex. 3 showed a little higher MH-ML, as shown by the results in Table 4.

TABLE 4

| | Comp. Ex. 1 | Ex. 2 | Ex. 3 | Ex. 4 | Comp. Ex. 5 | Ex. 6 | Ex. 7 |
|---|---|---|---|---|---|---|---|
| Mooney Viscometer | | | | | | | |
| MV 1 + 2 @ 121° C. (MU) | 52.27 | 52.70 | 51.36 | 53.20 | 70.13 | 66.14 | 75.03 |
| t5 (min.) | 19.65 | 19.66 | 16.29 | 21.19 | >30 | >30 | >30 |
| Rotorless Cure Meter | | | | | | | |
| ts2, 30 min. @ 177 C. (min.) | 1.03 | 1.03 | 0.83 | 1.00 | 0.67 | 0.60 | 0.56 |
| t10 (min.) | 1.19 | 1.23 | 0.99 | 1.18 | 0.71 | 0.67 | 0.61 |
| t50 (min.) | 2.32 | 2.51 | 1.74 | 2.59 | 1.71 | 1.76 | 1.62 |
| t90 (min.) | 4.81 | 5.36 | 3.63 | 5.58 | 5.70 | 5.49 | 5.18 |
| ML (lb-in) | 1.70 | 1.59 | 1.65 | 1.74 | 1.81 | 1.58 | 1.39 |
| MH (lb-in.) | 33.05 | 34.28 | 40.23 | 33.98 | 31.34 | 31.73 | 30.95 |
| (MH − ML) (lb-in) | 31.35 | 32.69 | 38.58 | 32.24 | 29.53 | 30.15 | 29.56 |

Compound dynamic properties were evaluated according to ASTM D-6204 using frequency sweeps on the RPA2000 tester at 66, 80 and 100° C. and 6.98% strain. The compound elastic modulus (G') results at 66° C. are shown in FIG. 4, and the tan δ results at 66° C. are in FIG. 5. There is some normal variation in G' and tan δ, but again, the results for the inventive compounds with kenaf fiber are comparable to those with nylon or polyester. These results are also presented in Table 5, and some additional strain sweep data at 66° C. are presented in Table 6.

TABLE 5

| Dynamic testing (Frequency sweeps) | Freq (Hz) | Comp. Ex. 1 | Ex. 2 | Ex. 3 | Ex. 4 | Comp. Ex. 5 | Ex. 6 | Ex. 7 |
|---|---|---|---|---|---|---|---|---|
| G' at 100° C., 6.98% strain (KPa) | 0.033 | 3698 | 3574 | 4323 | 3791 | 3098 | 3114 | 2929 |
| | 0.083 | 3687 | 3561 | 4284 | 3796 | 3177 | 3179 | 2997 |
| | 0.167 | 3723 | 3603 | 4307 | 3838 | 3264 | 3270 | 3064 |
| | 0.333 | 3759 | 3639 | 4315 | 3883 | 3347 | 3354 | 3139 |
| | 0.833 | 3842 | 3710 | 4364 | 3957 | 3497 | 3500 | 3257 |
| | 1.667 | 3930 | 3781 | 4413 | 4053 | 3654 | 3640 | 3383 |
| | 3.333 | 3975 | 3816 | 4412 | 4088 | 3770 | 3742 | 3475 |
| | 8.333 | 4132 | 3942 | 4522 | 4230 | 4033 | 3971 | 3697 |
| | 16.667 | 4161 | 3957 | 4552 | 4263 | 4192 | 4097 | 3843 |
| | 33.333 | 4205 | 3984 | 4521 | 4284 | 4327 | 4237 | 3934 |
| tan δ at 100° C., 6.98% strain | 0.033 | 0.121 | 0.113 | 0.095 | 0.111 | 0.132 | 0.127 | 0.129 |
| | 0.083 | 0.120 | 0.113 | 0.089 | 0.110 | 0.129 | 0.123 | 0.125 |
| | 0.167 | 0.119 | 0.112 | 0.088 | 0.108 | 0.131 | 0.122 | 0.126 |
| | 0.333 | 0.121 | 0.114 | 0.089 | 0.109 | 0.135 | 0.124 | 0.130 |
| | 0.833 | 0.125 | 0.117 | 0.094 | 0.112 | 0.142 | 0.129 | 0.136 |
| | 1.667 | 0.128 | 0.120 | 0.099 | 0.116 | 0.149 | 0.136 | 0.142 |
| | 3.333 | 0.129 | 0.122 | 0.101 | 0.117 | 0.152 | 0.140 | 0.146 |
| | 8.333 | 0.131 | 0.130 | 0.105 | 0.122 | 0.159 | 0.146 | 0.155 |
| | 16.667 | 0.143 | 0.141 | 0.096 | 0.137 | 0.153 | 0.157 | 0.144 |
| | 33.333 | 0.141 | 0.139 | 0.115 | 0.133 | 0.156 | 0.142 | 0.156 |
| G' at 80° C., 6.98% strain (KPa) | 0.033 | 3496 | 3245 | 3791 | 3488 | 3063 | 3112 | 2800 |
| | 0.083 | 3545 | 3287 | 3810 | 3542 | 3179 | 3216 | 2884 |
| | 0.167 | 3621 | 3341 | 3862 | 3601 | 3293 | 3320 | 2979 |
| | 0.333 | 3686 | 3397 | 3914 | 3663 | 3409 | 3417 | 3068 |
| | 0.833 | 3786 | 3482 | 3991 | 3771 | 3586 | 3571 | 3204 |
| | 1.667 | 3885 | 3569 | 4075 | 3862 | 3755 | 3712 | 3333 |
| | 3.333 | 3947 | 3619 | 4121 | 3917 | 3887 | 3825 | 3439 |
| | 8.333 | 4096 | 3754 | 4241 | 4072 | 4141 | 4051 | 3658 |
| | 16.667 | 4141 | 3782 | 4298 | 4112 | 4301 | 4189 | 3777 |
| | 33.333 | 4208 | 3850 | 4368 | 4176 | 4428 | 4322 | 3881 |
| tan δ at 80° C., 6.98% strain | 0.033 | 0.120 | 0.113 | 0.106 | 0.112 | 0.139 | 0.129 | 0.140 |
| | 0.083 | 0.123 | 0.116 | 0.110 | 0.114 | 0.139 | 0.130 | 0.142 |
| | 0.167 | 0.125 | 0.120 | 0.113 | 0.118 | 0.142 | 0.132 | 0.145 |
| | 0.333 | 0.127 | 0.123 | 0.116 | 0.121 | 0.145 | 0.134 | 0.148 |
| | 0.833 | 0.130 | 0.127 | 0.121 | 0.125 | 0.150 | 0.139 | 0.154 |
| | 1.667 | 0.133 | 0.132 | 0.127 | 0.129 | 0.155 | 0.145 | 0.160 |
| | 3.333 | 0.136 | 0.136 | 0.130 | 0.134 | 0.157 | 0.148 | 0.163 |
| | 8.333 | 0.140 | 0.141 | 0.138 | 0.140 | 0.159 | 0.152 | 0.167 |
| | 16.667 | 0.155 | 0.161 | 0.149 | 0.154 | 0.157 | 0.156 | 0.157 |
| | 33.333 | 0.154 | 0.155 | 0.151 | 0.156 | 0.155 | 0.154 | 0.167 |
| G' at 66° C., 6.98% strain (KPa) | 0.033 | 3343 | 3058 | 3525 | 3303 | 3060 | 3060 | 2717 |
| | 0.083 | 3400 | 3097 | 3572 | 3363 | 3184 | 3163 | 2809 |
| | 0.167 | 3464 | 3165 | 3637 | 3438 | 3303 | 3263 | 2903 |
| | 0.333 | 3535 | 3215 | 3694 | 3508 | 3427 | 3366 | 2992 |
| | 0.833 | 3635 | 3299 | 3773 | 3603 | 3612 | 3523 | 3133 |
| | 1.667 | 3723 | 3387 | 3864 | 3696 | 3775 | 3671 | 3256 |
| | 3.333 | 3775 | 3431 | 3907 | 3741 | 3907 | 3790 | 3365 |
| | 8.333 | 3925 | 3576 | 4050 | 3897 | 4158 | 4002 | 3568 |
| | 16.667 | 3960 | 3620 | 4093 | 3950 | 4287 | 4112 | 3654 |
| | 33.333 | 4049 | 3685 | 4143 | 4032 | 4434 | 4275 | 3787 |
| tan δ at 66° C., 6.98% strain | 0.033 | 0.120 | 0.119 | 0.123 | 0.119 | 0.144 | 0.134 | 0.145 |
| | 0.083 | 0.125 | 0.125 | 0.128 | 0.124 | 0.147 | 0.137 | 0.149 |
| | 0.167 | 0.127 | 0.127 | 0.131 | 0.126 | 0.149 | 0.139 | 0.152 |
| | 0.333 | 0.129 | 0.129 | 0.134 | 0.129 | 0.152 | 0.143 | 0.154 |
| | 0.833 | 0.132 | 0.134 | 0.140 | 0.133 | 0.155 | 0.148 | 0.159 |
| | 1.667 | 0.137 | 0.140 | 0.145 | 0.138 | 0.158 | 0.152 | 0.165 |
| | 3.333 | 0.144 | 0.148 | 0.152 | 0.147 | 0.162 | 0.156 | 0.168 |
| | 8.333 | 0.151 | 0.157 | 0.160 | 0.155 | 0.162 | 0.160 | 0.169 |
| | 16.667 | 0.166 | 0.166 | 0.175 | 0.172 | 0.168 | 0.172 | 0.188 |
| | 33.333 | 0.164 | 0.173 | 0.174 | 0.169 | 0.160 | 0.159 | 0.173 |

Compound physical properties were also tested using standard rubber testing. Table 7 shows the results of rubber hardness tested according to ASTM D-2240, Shore-A scale, for original and oven-aged compound samples. The results with kenaf are comparable to the results with nylon and polyester.

Table 7 also shows the tear results tested according to ASTM D-624, die-C, in two different directions, with grain (WG) and cross grain (XG). It can be seen that there is a drop in tear strength in the with-grain direction, a small drop in the cross-grain direction as well for the inventive kenaf examples relative to the comparative examples.

TABLE 6

| Dynamic Testing (Strain sweeps) | Strain (%) | Comp. Ex. 1 | Ex. 2 | Ex. 3 | Ex. 4 | Comp. Ex. 5 | Ex. 6 | Ex. 7 |
|---|---|---|---|---|---|---|---|---|
| G' at 66° C., 1.667 Hz (KPa) | 0.7 | 4828 | 4695 | 5739 | 5080 | 5253 | 5291 | 4791 |
| | 1.4 | 4274 | 4025 | 5001 | 4374 | 4588 | 4663 | 4156 |
| | 2.79 | 3895 | 3564 | 4403 | 3866 | 4046 | 4107 | 3695 |
| | 6.98 | 3626 | 3288 | 3822 | 3578 | 3720 | 3652 | 3246 |
| | 13.95 | 3532 | 3227 | 3715 | 3531 | 3508 | 3401 | 3016 |
| | 27.9 | 2830 | 2685 | 3014 | 2886 | 2752 | 2726 | 2393 |
| | 69.75 | — | — | — | — | 1894 | 1916 | 1622 |
| tanδ at 66° C., 1.667 Hz | 0.7 | 0.162 | 0.187 | 0.131 | 0.176 | 0.163 | 0.139 | 0.148 |
| | 1.4 | 0.168 | 0.194 | 0.146 | 0.181 | 0.192 | 0.166 | 0.176 |
| | 2.79 | 0.165 | 0.183 | 0.160 | 0.179 | 0.194 | 0.181 | 0.185 |
| | 6.98 | 0.143 | 0.147 | 0.151 | 0.148 | 0.165 | 0.161 | 0.174 |
| | 13.95 | 0.130 | 0.131 | 0.135 | 0.131 | 0.154 | 0.146 | 0.160 |
| | 27.9 | 0.146 | 0.139 | 0.161 | 0.144 | 0.171 | 0.156 | 0.174 |
| | 69.75 | — | — | — | — | 0.197 | 0.179 | 0.185 |

Table 8 shows the tensile test results in the with-grain direction in the low strain region. Modulus was determined using common tensile modulus measurements, in accordance with ASTM D-412 (die C), and "modulus" herein refers to tensile stress at given elongation as defined in ASTM D-1566 and D-412. The replacement of the nylon fiber in Comp. Ex. 5 has little change on the compound modulus in the low strain region of Ex. 6 and 7. However, the replacement of the polyester fiber in Comp. Ex. 1 seems to reduce the compound modulus in the low strain region of Ex. 2-4. This effect may be because of very high filler loading (total~145 phr) in these compounds, causing difficulty dispersing the fiber and/or low adhesion between kenaf fiber and the SBR/NR rubber matrix. Table 8 also shows the tensile test results in the cross-grain direction in the low strain region. In the cross-grain direction, the results of the kenaf examples are comparable.

TABLE 7

| | Comp. Ex. 1 | Ex. 2 | Ex. 3 | Ex. 4 | Comp. Ex. 5 | Ex. 6 | Ex. 7 |
|---|---|---|---|---|---|---|---|
| Shore A Hardness | | | | | | | |
| Original | 88 | 86 | 88 | 88 | 86 | 85 | 86 |
| Oven Aged | 92 | 92 | 90 | 92 | 84 | 85 | 86 |
| Tear Strength (lbs/in) | | | | | | | |
| Tear - WG | 243 | 190 | 187 | 177 | 379 | 352 | 336 |
| Tear - XG | 183 | 179 | 158 | 164 | 370 | 336 | 335 |

TABLE 8

| Tensile test | Comp. Ex. 1 | Ex. 2 | Ex. 3 | Ex. 4 | Comp. Ex. 5 | Ex. 6 | Ex. 7 |
|---|---|---|---|---|---|---|---|
| Modulus at 5% (WG) (psi) | 675 | 253 | 468 | 383 | 291 | 354 | 323 |
| Modulus at 10% (WG) (psi) | 991 | 419 | 750 | 630 | 436 | 529 | 487 |
| Modulus at 20% (WG) (psi) | 1580 | 750 | 1197 | 1061 | 664 | 773 | 715 |
| Modulus at 25% (WG) (psi) | 1670 | 896 | 1367 | 1232 | 780 | 866 | 800 |
| Modulus at 5% (XG) (psi) | 230 | 219 | 240 | 239 | 211 | 209 | 210 |
| Modulus at 10% (XG) (psi) | 333 | 323 | 359 | 350 | 302 | 295 | 295 |
| Modulus at 20% (XG) (psi) | 492 | 503 | 561 | 525 | 411 | 396 | 393 |
| Modulus at 25% (XG) (psi) | 559 | 589 | 650 | 604 | 453 | 434 | 428 |

FIG. 6 show some WG results and FIG. 7 some XG results of the DeMattia flex crack growth test according to ASTM D-430 (pierced) at 120° C., 2" stroke. It can be seen that the replacing of nylon fiber with kenaf fiber improved the material's crack resistance property for Ex. 6 and 7. However, this phenomenon was not observed in Ex. 2-4, wherein the DeMattia test results were the same for kenaf fiber as for polyester fiber.

Table 9 shows the results of two abrasion tests for wear resistance, the so-called DIN test (DIN 53516 or ISO 4649) and the PICO abrasion test (ASTM D-2228). The DIN test results are in terms of volume loss, so lower is better. The PICO test is reported as an index, and a higher index indicates better resistance to abrasion. It can be seen that the abrasion resistance for kenaf fiber in Ex. 2-4 is comparable to that of Comp. Ex. 1 with polyester. However, the abrasion resistance for kenaf fiber in Ex. 6-7 is not as good as for the nylon in Comp. Ex. 5.

TABLE 9

| Wear Resistance | Comp. Ex. 1 | Ex. 2 | Ex. 3 | Ex. 4 | Comp. Ex. 5 | Ex. 6 | Ex. 7 |
|---|---|---|---|---|---|---|---|
| DIN abrasion, Volume loss (mm³) | 246 | 236 | 243 | 257 | 87 | 126 | 109 |

TABLE 9-continued

| Wear Resistance | Comp. Ex. 1 | Ex. 2 | Ex. 3 | Ex. 4 | Comp. Ex. 5 | Ex. 6 | Ex. 7 |
|---|---|---|---|---|---|---|---|
| PICO abrasion index | 76 | 80 | 79 | 79 | 151 | 104 | 107 |

The results of the above tests on the example compounds indicate that Kenaf fiber can be used in place of nylon and polyester fiber in belt compounds. Results with kenaf are comparable for Mooney viscosity, scorch time, cure speed, dynamic properties, material hardness, and cross-grain tensile properties. Some other properties have mixed results which may require some adjustments to the formulations. Tear strength shows a little drop, but the compounds should still be useful for belts. A drop in with-grain modulus at lower strains in the SBR/NR compound could be improved with filler or fiber loading adjustments, but such adjustment was not needed for the EPM compounds. It was observed that the kenaf fiber improved flex crack resistance for the EPM compounds, but had no effect on the SBR/NR compounds. The abrasion resistance of kenaf-reinforced compounds appears to be comparable to polyester-reinforced compounds, but somewhat inferior to nylon fiber-reinforced compounds. Dispersion of the kenaf fibers in the compounds appeared to be very good, but the results probably indicate that adhesion between fiber and matrix could stand to be improved. Adhesion could be improved by using different amounts or types of compatibilizers and/or by using adhesive fiber treatment as described herein.

A series of examples based on a third formulation, shown in Table 10, was evaluated. The base elastomer for the third series was polychloroprene (CR). The control compound, Comp. Ex. 8 contained 9 parts per 100 parts of elastomer by weight of an aramid fiber. The aramid fiber was 1-mm cut fiber Twaron® para-aramid fiber sold under that trademark by Teijin Aramid. The inventive examples, Ex. 9-12, included various amounts of Kenaf fiber substituted for lesser amounts of aramid fiber, approximately at a 3:2 substitution ratio of kenaf for aramid fiber, by weight. The kenaf was obtained from Procotex Corporation.

TABLE 10

| Formulations (PHR) | Comp. Ex. 8 | Ex. 9 | Ex. 10 | Ex. 11 | Ex. 12 |
|---|---|---|---|---|---|
| CR elastomer[1] | 100 | 100 | 100 | 100 | 100 |
| Aramid Fiber (1-mm cut) | 9.0 | 7.0 | 5.0 | 3.0 | 0 |
| Kenaf fiber (2-mm chopped) | 0- | 3.0 | 6.0 | 9.0 | 13.0 |

[1]The CR compound includes the usual assortment of fillers, curatives, etc.

Compound rheological properties and cure properties were evaluated as before, and the results are shown in Table 11. The replacement of the aramid fiber in Comp. Ex. 8 with kenaf fiber results in reduced compound Mooney viscosity (MV), which is surprising in light of the increased loading of kenaf used and the longer fiber length. as shown by the results in Table 4. Scorch time (t5) is somewhat increased by substituting kenaf for aramid. Cure properties show an increase in MH and torque difference (MH-ML), indicating more reinforcement from the kenaf than the aramid in the control, which could be attributable to the longer fiber length and higher loading than in the control. Compound cure time for the kenaf examples increased relative to the control.

Table 12 shows the cured compound physical property results for the substitution of kenaf for aramid in the CR composition. Hardness and tear strength results were all comparable to each other. Tensile test results in the with-grain and cross-grain directions were comparable except for the highest loaded Ex. 12. The strength and modulus properties of Ex. 12 seem lower than might be expected. From another viewpoint, Ex. 9-10 physicals could be higher than expected. This could be indicative of a synergy between the two types of fibers in Ex. 9-11, since Ex. 9-11 with a fiber mixture had higher properties than either Comp. Ex. 8 or Ex. 12 with only one fiber type. Table 12 also shows the Pico abrasion index results, which seem to show the same trend as the tensile test results.

TABLE 11

| | Comp. Ex. 8 | Ex. 9 | Ex. 10 | Ex. 11 | Ex. 12 |
|---|---|---|---|---|---|
| Mooney Viscometer | | | | | |
| MV 1 + 2 @ 121° C. (MU) | 106.27 | 105.24 | 104.73 | 99.04 | 94.77 |
| t5 (min.) | 8.7 | 10.3 | 10.5 | 10.5 | 11.1 |
| Rotorless Cure Meter | | | | | |
| ts2, 30 min. @ 177 C. (min.) | 0.13 | 1.28 | 0.13 | .011 | .010 |
| t10 (min.) | 1.48 | 1.742 | 1.52 | 1.54 | 1.27 |
| t50 (min.) | 3.13 | 3.58 | 3.47 | 3.65 | 3.44 |
| t90 (min.) | 12.7 | 11.9 | 15.8 | 18.1 | 19.0 |
| ML (lb-in) | 4.5 | 3.7 | 4.0 | 3.0 | 2.3 |
| MH (lb-in.) | 47.5 | 43.9 | 51.4 | 46.7 | 54.2 |
| (MH − ML) (lb-in) | 43.0 | 40.2 | 47.4 | 43.7 | 51.9 |

From this series of examples, Ex. 11 was chosen as having the best overall properties, and therefore Ex. 11 was made into V-belt form for comparison with control belts using Comp. Ex. 8. The V-belt construction was a dual-notched variable speed (CVT) belt design with a top fabric on the back-side notches and another fabric on the under-side notches. The reinforcing tensile cord included was standard aramid tensile cord embedded in an adhesion gum. The kenaf and aramid fiber-loaded compositions were used in both the over cord and under cord portions of the belt body. The resulting belts were tested on two durability tests, one at 40 Nm load and one at 36 Nm load. On the 40 Nm durability test, the two control belts averaged 6.3 hours before slipping indicated failure (7.3 and 5.2 hours for the two individual belts tested). On the 40 Nm durability test, the belt with Ex. 11 ran 6.3 hours, exactly the average of the two control belts. On the 36 Nm durability test, the control belt ran 200.4 hours before notch cracking indicated failure. On the 36 Nm durability test, the inventive belt with Ex. 11 ran 314.0 hours before exhibiting root crack failure. Thus, the inventive belt had more than 50% longer life than the control belt at this load level. This improvement in belt life under a cracking failure mode is consistent with the improved crack resistance exhibited by the first example formulations (the EPM compositions) above.

TABLE 12

| Physical Properties | Comp. Ex. 8 | Ex. 9 | Ex. 10 | Ex. 11 | Ex. 12 |
|---|---|---|---|---|---|
| Shore A Hardness | 88 | 89 | 90 | 90 | 88 |
| Tear Strength (lbs/in) | | | | | |
| Tear - WG | 310 | 340 | 320 | 300 | 310 |
| Tear - XG | 180 | 190 | 200 | 195 | 180 |

TABLE 12-continued

| Physical Properties | Comp. Ex. 8 | Ex. 9 | Ex. 10 | Ex. 11 | Ex. 12 |
|---|---|---|---|---|---|
| Tensile test | | | | | |
| Tensile Strength (WG) (psi) | 3216 | 3541 | 3270 | 3091 | 2728 |
| Elongation (WG) (%) | 13 | 14 | 12 | 15 | 15 |
| Modulus at 5% (WG) (psi) | 1664 | 1818 | 1849 | 1743 | 1388 |
| Modulus at 10% (WG) (psi) | 2920 | 3196 | 3056 | 2796 | 2335 |
| Modulus at 20% (WG) (psi) | — | — | — | — | 1314 |
| Tensile Strength (XG) (psi) | 1570 | 1700 | 1729 | 1630 | 1612 |
| Elongation (XG) (%) | 62 | 74 | 65 | 68 | 97 |
| Modulus at 5% (XG) (psi) | 301 | 305 | 400 | 358 | 292 |
| Modulus at 10% (XG) (psi) | 509 | 504 | 685 | 609 | 521 |
| Modulus at 20% (XG) (psi) | 863 | 824 | 1089 | 993 | 791 |
| PICO abrasion index | 61 | 71 | 65 | 70 | 62 |

Thus, according to various embodiments of the invention, kenaf fiber in belt applications can provide performance comparable to or better than more expensive synthetic fibers, and provide an environmentally friendly reinforcing filler for a belt body rubber compound.

Likewise, inventive compounds described herein can be used in other elastomeric devices used in automotive, industrial, and other applications.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A power transmission belt comprising an elastomeric belt body and a helically wound tensile member embedded in the belt body, said elastomeric belt body comprising a cured elastomeric composition comprising kenaf fiber;
   wherein the elastomeric composition comprises a polychloroprene base elastomer; and
   wherein the elastomeric composition comprises a second type of fiber, wherein the second type of fiber is short aramid fiber.

2. The belt of claim 1 wherein said kenaf fiber comprises bast fiber with average fiber diameter of about 20 microns.

3. The belt of claim 1 wherein said kenaf fiber is present in the elastomeric composition at a level of 1 to 50 parts per hundred of base elastomer.

4. The belt of claim 2 wherein said kenaf fiber is chopped bast fiber with average fiber length of 1 to 3 mm.

5. The belt of claim 3 wherein said composition further comprises a compatibilizer that aids dispersion or adhesion of the kenaf fiber in the base elastomer.

6. A power transmission belt comprising an elastomeric belt body, a tensile cord, and a sheave contact portion; said elastomeric belt body comprising a cured elastomeric composition comprising kenaf fiber;
   wherein the elastomeric composition comprises a polychloroprene base elastomer; and
   wherein the elastomeric composition comprises a second type of fiber, wherein the second type of fiber is short aramid fiber.

7. The power transmission belt of claim 6 in the form of a V-belt, a toothed belt, or a multi-V-ribbed belt.

8. The belt of claim 7 wherein said kenaf fiber comprises bast fiber.

9. The belt of claim 8 wherein said kenaf fiber is present in the elastomeric composition at a level of 1 to 50 parts per hundred parts of base elastomer.

10. The belt of claim 9 wherein said kenaf fiber is chopped bast fiber with average fiber length of 1 to 3 mm and with average fiber diameter of about 20 microns.

11. The belt of claim 10 wherein said composition further comprises a compatibilizer that aids dispersion or adhesion of the kenaf fiber in the base elastomer.

* * * * *